United States Patent
He et al.

(10) Patent No.: US 12,033,232 B2
(45) Date of Patent: Jul. 9, 2024

(54) IMAGE WATERMARKED WITH A STRING ASSOCIATED WITH IMAGE METADATA ASSOCIATED WITH THE IMAGE

(71) Applicant: Google LLC, Mountain View, CA (US)

(72) Inventors: Daan He, Mountain View, CA (US); Dake He, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 283 days.

(21) Appl. No.: 17/298,012

(22) PCT Filed: Jun. 18, 2020

(86) PCT No.: PCT/US2020/038489
§ 371 (c)(1),
(2) Date: May 27, 2021

(87) PCT Pub. No.: WO2020/257493
PCT Pub. Date: Dec. 24, 2020

(65) Prior Publication Data
US 2022/0092721 A1    Mar. 24, 2022

(30) Foreign Application Priority Data
Jun. 19, 2019 (WO) ................ PCT/US2019/037995

(51) Int. Cl.
*G06T 1/00*       (2006.01)
*H04N 21/8358*    (2011.01)

(52) U.S. Cl.
CPC ......... *G06T 1/005* (2013.01); *H04N 21/8358* (2013.01); *G06T 2201/0051* (2013.01);
(Continued)

(58) Field of Classification Search
CPC ............. G06T 1/005; G06T 2201/0051; G06T 2201/0065; G06T 2201/0083;
(Continued)

(56) References Cited

U.S. PATENT DOCUMENTS 6,680,921 B1 *  1/2004  Svanbro .............. H04L 65/65
                                            370/324
2016/0150297 A1   5/2016  Petrovic et al.
(Continued)

FOREIGN PATENT DOCUMENTS

CN         1790420 A       6/2006
CN       102216941 A      10/2011
(Continued)

OTHER PUBLICATIONS

First Examination Report for India Application No. 202127022294, dated Feb. 24, 2022.
(Continued)

*Primary Examiner* — Christopher Wait
(74) *Attorney, Agent, or Firm* — MARSHALL, GERSTEIN & BORUN LLP (57) ABSTRACT

The present disclosure provides systems and methods for improved image watermarking to improve robustness and capacity, without degrading perceptibility. Specifically, the systems and methods discussed herein allow for a higher decoding success rate, at the same distortion level and message rate; or a higher message rate, at the same distortion level and decoding success rate. Implementations of these systems utilize a side chain of additional information, available only to the decoder and not the encoder, to achieve asymptotically lossless data compression, allowing the same message to be transmitted in fewer bits.

15 Claims, 5 Drawing Sheets

(52) U.S. Cl.
CPC ............... *G06T 2201/0065* (2013.01); *G06T 2201/0083* (2013.01); *G06T 2201/0202* (2013.01)

(58) Field of Classification Search
CPC ........ G06T 2201/0202; H04N 21/8358; H04N 21/44008; H04N 21/23418
See application file for complete search history.

(56) References Cited

U.S. PATENT DOCUMENTS

| | | | |
|---|---|---|---|
| 2016/0309238 A1* | 10/2016 | An | H04N 21/2353 |
| 2016/0360288 A1* | 12/2016 | Mandyam | H04N 21/4302 |

FOREIGN PATENT DOCUMENTS

| | | |
|---|---|---|
| CN | 102461066 A | 5/2012 |
| EP | 1 190 548 | 3/2002 |
| JP | 2003-502947 A | 1/2003 |
| JP | 2015-531189 A | 10/2015 |
| JP | 2018-527772 A | 9/2018 |
| KR | 10-2016-0075696 A | 6/2016 |
| KR | 10-2018-0017011 A | 2/2018 |
| WO | WO-0161508 A1 | 8/2001 |
| WO | WO-2015/084004 A1 | 6/2015 |

OTHER PUBLICATIONS

Notice of Reasons for Rejection for Japanese Application No. 2021-531779, dated Aug. 1, 2022.
Office Action, Korean Patent Application No. 10-2021-7016131, dated Oct. 26, 2022.
International Search Report for PCT Appln. Ser. No. PCT/US2020/038489 dated Sep. 4, 2020 (3 pages).
PCT International Search Report and Written Opinion dated Oct. 15, 2019 in International Application No. PCT/US2019/037959.
Written Opinion for PCT Appln. Ser. No. PCT/US2020/038489 dated Apr. 8, 2021 (10 pages).
First Office Action for Chinese Patent Application No. 202080006695.8, dated Sep. 7, 2023.
International Preliminary Report on Patentability for Application No. PCT/US2019/037959, dated Dec. 30, 2021.
International Preliminary Report on Patentability for Application No. PCT/US2020/038489, dated Sep. 8, 2021.
Notice of Allowance for Korean Application No. 10-2021-7016131, dated Jun. 27, 2023.

* cited by examiner

*FIG. 4* ns, the decoder is configured to extract the timestamp of the capture from a header of a packet comprising the capture. In some implementations, the binary string of the embedded watermark comprises a subset of the timestamp of the image. In a further implementation, the decoder is configured to decode the identifier from the binary string by concatenating the portion of the timestamp of the capture with the subset of the timestamp of the image. In another further implementation, the binary string of the embedded watermark comprises a number of error correction bits greater than a difference between a length of the timestamp of the image and a length of the subset of the timestamp of the image.

IMAGE WATERMARKED WITH A STRING ASSOCIATED WITH IMAGE METADATA ASSOCIATED WITH THE IMAGE

CROSS-REFERENCE TO RELATED APPLICATIONS

The present application is a National Stage Application, filed under 35 U.S.C. 371, of International Patent Application No. PCT/US2020/038489 filed on Jun. 18, 2020 titled "IMPROVED IMAGE WATERMARKING," which in turn claims the benefit of and priority to International Patent Application No. PCT/US2019/037959 filed on Jun. 19, 2019 titled "IMPROVED IMAGE WATERMARKING," the entireties of which are incorporated by reference herein.

RELATED APPLICATIONS

The present application claims the benefit of and priority to P.C.T. Application No. PCT/US2019/037959, entitled "Improved Image Watermarking," filed Jun. 19, 2019, the entirety of which is incorporated by reference herein.

BACKGROUND

Image watermarking is a technique that embeds visually imperceptible data or messages into an image, and may be categorized as non-blind or blind, dependent respectively on whether the original image is necessary for watermark extraction. Blind watermarking is particularly useful in that the embedded data may be recovered without having access to the original pre-embedded image.

However, current implementations of blind image watermarking may have issues with perceptibility (e.g. whether distortion introduced by embedding the watermarking message may be detectable by a viewer), robustness (e.g. the rate of success in a decoder decoding the embedded message), and capacity (e.g. the amount of data or rate that data may be embedded in the image). In many implementations, increasing one of these may result in drastic degradations in the others.

SUMMARY

The systems and methods discussed herein provide for improved image watermarking to improve robustness and capacity, without degrading perceptibility. Specifically, the systems and methods discussed herein allow for a higher decoding success rate, at the same distortion level and message rate; or a higher message rate, at the same distortion level and decoding success rate. Implementations of these systems utilize a side chain (or side channel) of additional information, available only to the decoder and not the encoder, to achieve asymptotically lossless data compression, allowing the same message to be transmitted more robustly or in fewer bits.

In one aspect, the present disclosure is directed to a system for improved watermarking. The system includes a decoder of a device. The decoder is configured to receive a capture of an image comprising at least one embedded watermark; determine a timestamp of the capture; decode a binary string from the embedded watermark; using a portion of the timestamp of the capture, decode an identifier from the binary string comprising a timestamp of the image; and output the decoded identifier.

In some implementations, the timestamp of the capture is identified in metadata of the capture. In some implementations, the decoder is configured to decode the identifier from the binary string by combining the portion of the timestamp of the capture with a predetermined offset. In a further implementation, the decoder is configured to decode the identifier from the binary string by iteratively combining the portion of the timestamp of the capture with a multiple of the predetermined offset until successfully decoding the identifier.

In some implementations, the binary string comprises an address of a content server that generated the image comprising the at least one embedded watermark. In a further implementation, the binary string comprises an identifier of a process of the content server that generated the image comprising the at least one embedded watermark.

In another aspect, the present disclosure is directed to a method for improved watermarking. The method includes receiving, by a decoder of a device from a client device, a capture of an image comprising at least one embedded watermark. The method also includes determining, by the decoder, a timestamp of the capture. The method also includes decoding, by the decoder, a binary string from the embedded watermark. The method also includes using a portion of the timestamp of the capture, decoding, by the decoder, an identifier from the binary string comprising a timestamp of the image. The method also includes outputting, by the decoder, the decoded identifier.

In some implementations, the timestamp of the capture is identified in metadata of the capture. In some implementations, the method includes extracting, by the decoder, the timestamp of the capture from a header of a packet comprising the capture. In some implementations, the binary string of the embedded watermark comprises a subset of the timestamp of the image. In a further implementation, the method includes concatenating the portion of the timestamp of the capture with the subset of the timestamp of the image. In another further implementation, the binary string of the embedded watermark comprises a number of error correction bits greater than a difference between a length of the timestamp of the image and a length of the subset of the timestamp of the image.

In some implementations, the method includes combining the portion of the timestamp of the capture with a predetermined offset. In a further implementation, the method includes iteratively combining the portion of the timestamp of the capture with a multiple of the predetermined offset until successfully decoding the identifier.

In some implementations, the binary string comprises an address of a content server that generated the image comprising the at least one embedded watermark. In a further implementation, the binary string comprises an identifier of a process of the content server that generated the image comprising the at least one embedded watermark.

In another aspect, the present disclosure is directed to a watermarking system. The system includes an encoder of a device configured to: receive an image and metadata associated with the image; generate a binary string from a subset of the metadata associated with the image; encode a watermark from the binary string; and embed the watermark in the image. A decoder of the device or a second device recovers the metadata associated with the image from the subset of the metadata associated with the image encoded in the embedded watermark and additional metadata associated with a capture of a display of the image at a third device.

In some implementations, the metadata associated with the image comprises a timestamp of the image, and the additional metadata comprises a timestamp of the capture of the display of the image at the third device. In some implementations, the encoder of the device is configured to generate the binary string from a predetermined number of least significant bits of the metadata associated with the image.

In another aspect, the present disclosure is directed to a method for watermarking. The method includes receiving, by an encoder of a device, an image and metadata associated with the image. The method also includes generating, by the encoder, a binary string from a subset of the metadata associated with the image. The method also includes encoding, by the encoder, a watermark from the binary string. The method also includes embedding, by the encoder, the watermark in the image. A decoder of the device or a second device recovers the metadata associated with the image from the subset of the metadata associated with the image encoded in the embedded watermark and additional metadata associated with a capture of a display of the image at a third device.

In some implementations, the metadata associated with the image comprises a timestamp of the image, and the additional metadata comprises a timestamp of the capture of the display of the image at the third device. In some implementations, the method includes generating the binary string from a predetermined number of least significant bits of the metadata associated with the image.

The present disclosure also provides a computer program comprising instructions that, when executed by a computing device, cause the computing device to perform any of the methods disclosed herein. The present disclosure also provides a computer-readable medium comprising instructions that, when executed by a computing device, cause the computing device to perform any of the methods disclosed herein.

Optional features of one aspect may be combined with any other aspect.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Image watermarking is a technique that embeds visually imperceptible data or messages into an image, and may be categorized as non-blind or blind, dependent respectively on whether the original image is necessary for watermark extraction. Blind watermarking is particularly useful in that the embedded data may be recovered without having access to the original pre-embedded image.

Figure 1A:
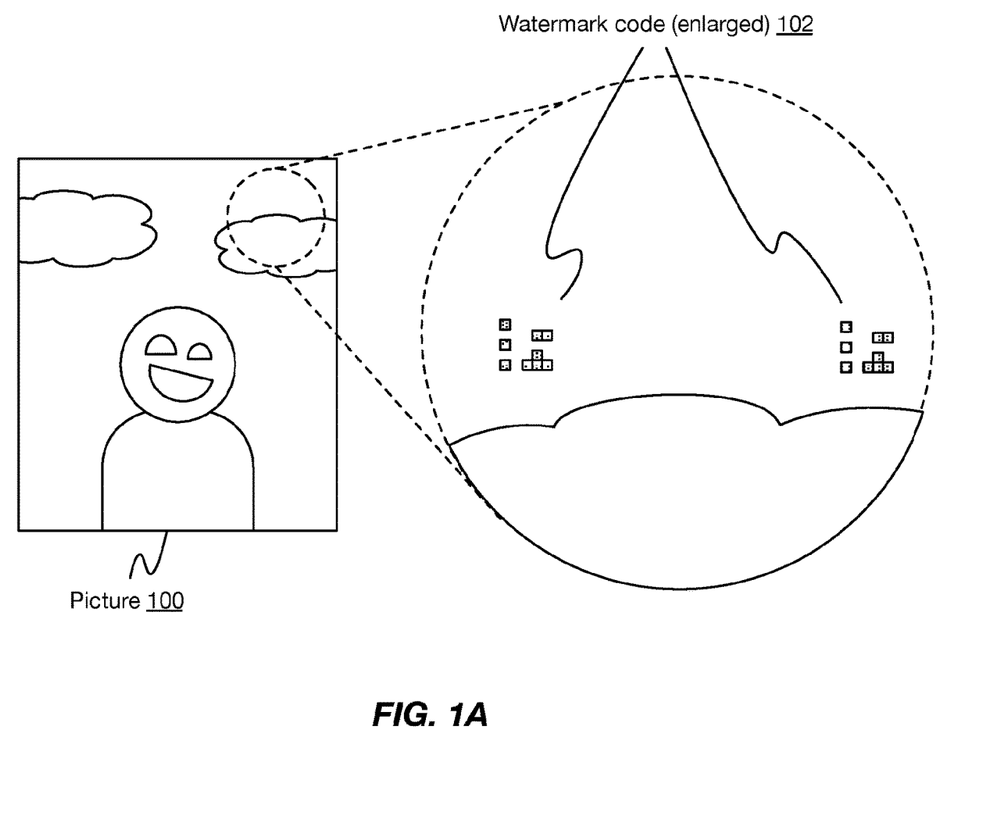
FIG. 1A is an illustration of an example implementation of image watermarking.

For example, referring briefly to FIG. 1A, illustrated is an example implementation of image watermarking for an image 100. A small watermark code 102 may comprise an array of pixels of a size and placed within an image 100 such that they are not visible to viewers. As shown, watermark codes 102 may be duplicated throughout the image, to provide resistance against cropping, regional artifacts due to compression or other impairment, or other such distortions. Although shown with just a few pixels for clarity, in many implementations, a watermark code may comprise a region with 64 pixels, 128 pixels, or any other such amount. Adjustments to the pixels to define values of the encoding may be relatively imperceptible, as opposed to simply black and white pixels. For example, in many implementations, the pixels that make up the encoded region may have colors matching or similar to the surrounding pixels, but with adjusted alpha (transparency) values. For example, the encoding may change a pixel with an alpha value of 0 to an alpha value of 10, 50, 100, 255, or any other such value. In some implementations, the code may be detected by identifying pixels with alpha values that widely vary from surrounding alpha values. In some implementations, differential encoding may be applied with an overlay encoding each bit, with changes to alpha values of pixels within the overlay to encode a different value.

Figure 1B:
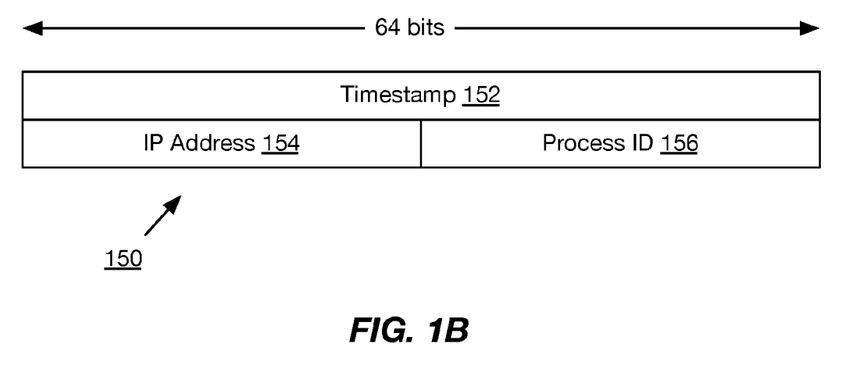
FIG. 1B is an illustration of a data format for image watermarking, according to one implementation.

Any sort of data may be encoded within the watermarks 102. Referring briefly to FIG. 1B, illustrated is a data format 150 for image watermarking, according to one implementation. The illustrated data format comprises 128 bits, with a 64 bit timestamp 152 (e.g. based on an epoch time), an IP address 154, and a process identifier 156. Data in the data format 150 may be referred to herein as a query ID. Many implementations also include error correction bits (not illustrated) to improve decoding of the watermark. For example, the code may be encoded as a QR code with Reed-Solomon error correction codes included within the mark.

In one such implementation, the data may be encoded by a content server into an image prior to providing the image to a client device, with an IP address of the content server and a process identifier of the process that generated the image. Subsequently, when the image is received and rendered by the client device, a monitoring process on the client device may capture a screenshot of the image and provide the screenshot to the content server or a monitoring server. For example, the monitoring process on the client device may not be able to access the image itself (e.g. the image may be stored in a location in the memory of the client device to which the monitoring process does not have access), but can capture a screenshot of the image (e.g. by reading image data from a frame buffer, or by capturing the image with a camera). The server may decode the watermark to identify the original generating process and server, as well as the time at which the image was generated or marked, and may compare the screenshotted image to the original image. This may allow a system to automatically identify distortion or image corruption caused by rendering or encoding processes for the image, as well as identifying other aspects of the image. In implementations in which the content server and monitoring server are different, this may particularly allow the monitoring server to identify a particular content server of a plurality of content servers that provided the image to the client device. This may be useful for logging, tracking, and analysis, and may be significantly easier than attempting to retrieve HTTP logs or similar logs from the client device (to which the monitoring server may not have access).

Watermarking efficiency may be described in terms of perceptibility (e.g. whether distortion introduced by embedding the watermarking message may be detectable by a viewer), sometimes referred to as "D"; robustness (e.g. the rate of success in a decoder decoding the embedded message), sometimes referred to as "E"; and capacity (e.g. the amount of data or rate that data may be embedded in the image), sometimes referred to as "R". It may be desirable in many implementations to have low perceptibility, high robustness, and high capacity. However, in many implementations, improving one of these may result in drastic degradations in the others. For example, adding more data to the message while maintaining robustness may require enlarging the size of the watermark, making it more perceptible. Similarly, the mark size may be maintained while adding data by removing error correction bits, although this naturally makes the mark tougher to decode and more prone to corruption.

Figure 2A:
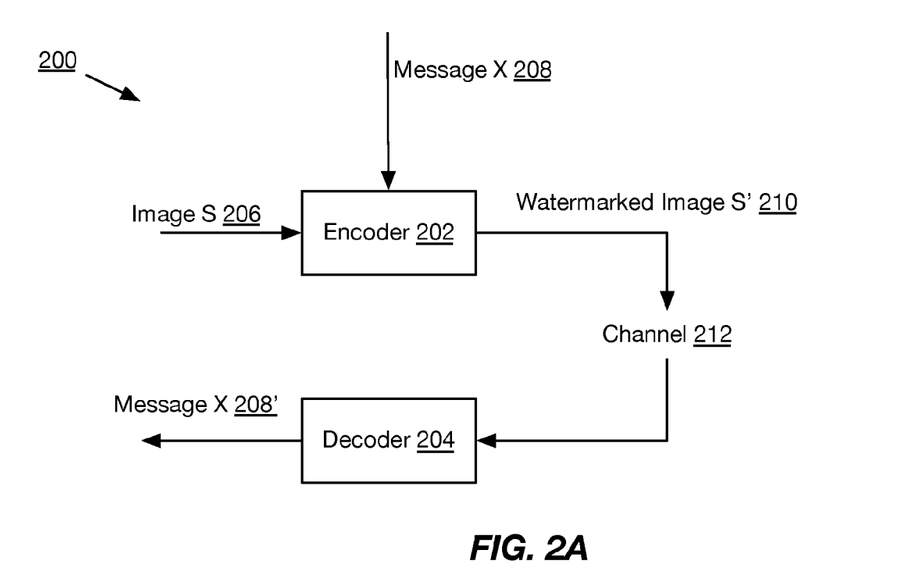
FIG. 2A is a block diagram of a system for image watermarking, according to one implementation.

FIG. 2A is a block diagram of a system 200 for image watermarking, according to one implementation. The system may comprise an encoder 202 and decoder 204, which may be on the same or different computing devices (e.g. a content server and a monitoring server). An image "S" 206 may be encoded by an encoder 202 with a message "X" 208 to create a watermarked image "S'" 210 comprising S+X. The encoded or watermarked image S' may be transmitted over a communication channel 212, such as to a client device. A corresponding watermarked image (e.g. from a screenshot, as discussed above), may be provided to the decoder 204. For example, the client device may send the watermarked image to the decoder 204 via the communication channel 212. The communication channel may thus comprise any combination of networks and devices between the encoder and decoder, which may potentially introduce any sort of additional distortion. For example, the channel may be lossy as a result of either intentional or unintentional attacks or impairments. Examples of unintentional impairments include rotation of the image, scaling, and format conversion. Examples of intentional impairments include noise injection (e.g. adding information), and attempts to remove watermarking codes (e.g. subtracting information).

The decoder 204 may detect and decode the watermark from the watermarked image S' to recover the original message X 208', applying error correction as needed (and potentially capturing multiple watermarks in the image and comparing decoded messages from each to rule out errors or distortion in single watermarks).

Accordingly, the encoder may encode a message, such as the timestamp/address/process ID string discussed above, along with any error correction codes, into a mark such as a QR code; and encode at least one copy of the mark into an image via blending of an alpha channel overlay, and the decoder may decode the message by detecting the overlay pattern and inconsistencies identifying the QR code; decode the original string; and identify the original timestamp/address/process ID.

Such systems are relatively successful, but have high error rates. In one experiment involving decoding embedded marks from screenshots of encoded images, the decoding success rate was: 44.03%.

As noted above, given a fixed message rate (e.g. 128 bits), the factors that impact decoding success rate are distortion introduced to the image by the encoder ($D_e$) and distortion between the captured screenshot and the watermarked image at the encoder output ($D_c$). In general, the robustness of image watermarking as measured in decoding success rate is controlled by $D_e$: for the same $D_c$, if $D_e$ is increased, the higher the decoding success rate can be achieved. However, for most purposes, the watermarks must be visually imperceptible in the watermarked image. Such a requirement imposes an upper bound on $D_e$. This constraint on $D_e$ essentially implies an upper bound of decoding success rate for any given channel. In some extreme cases where $D_c$ introduced by the channel is large, the decoding success rate can drop to near zero, and thus limits the applicability of such implementations of watermarking.

Let ($D_0$, $E_0$, $R_0$) denote the distortion, decoding success rate, and message rate, respectively, of implementations of the watermarking method discussed above. In typical implementations, improvement of one of the three quantities will inevitably come at the cost of performance loss in at least one of the other quantities. For example, to improve $E_0$, one needs to sacrifice $D_0$ while maintaining $R_0$, or reduce $R_0$ while maintaining $D_0$. In many applications, however, both $D_0$ and $R_0$ currently have hard constraints: $D_0$ is necessarily upper-bounded to avoid negative impact on user experience, and $R_0$ is necessarily lower-bounded so that the watermarking message is useful, e.g. for tracking purposes. In this context, current implementations of watermarking have little room for improving $E_0$.

The systems and methods discussed herein provide for improved image watermarking to improve robustness and capacity, without degrading perceptibility. Specifically, the systems and methods discussed herein allow for a higher decoding success rate, at the same distortion level and message rate; or a higher message rate, at the same distortion level and decoding success rate. Implementations of these systems utilize a side chain of additional information, available only to the decoder and not the encoder, to achieve asymptotically lossless data compression, allowing the same message to be transmitted in fewer bits.

Since the distortion constraint is given by the application, the systems discussed herein focus on the tradeoff between the decoding success rate and the message rate. Specifically, the system circumvents the above mentioned lower-bound of the message rate without compromising the usefulness of the watermarking message. Consequently, it allows for greater flexibility in finding the right tradeoff between robustness and capacity that was not possible in prior implementations. Specifically, side information, available only at the decoder, may be used to achieve asymptotically lossless compression.

Figure 2B:
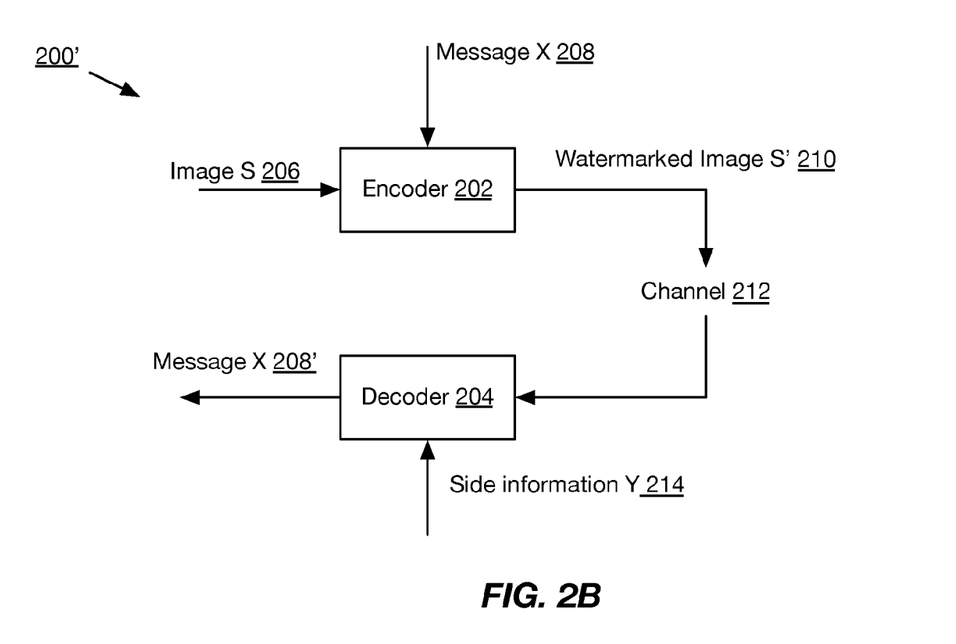
FIG. 2B is a block diagram of a system for image watermarking, according to another implementation.

FIG. 2B is a block diagram of a system 200' for image watermarking, according to one such implementation. As discussed in connection with FIG. 2A, an encoder 202 encodes an image 206 with a message 208 to generate a watermarked image 210, which may be provided via a communications channel 212 to a decoder 204. However, to recover the original message 208', the decoder uses additional side information "Y" 214, unavailable to the encoder. This obviates any requirement of separate communication between the encoder and decoder, which may be particularly advantageous in implementations in which the content server and monitoring server are not the same device (and may not be controlled by the same entity).

Between FIGS. 2A and 2B, the main difference is the introduction of side information Y at the decoder in FIG. 2B. It follows from the classical source coding theorem that the minimum rate required for lossless recovery of message X at the decoder in FIG. 2A is given by the marginal entropy H(X) of X. Correspondingly, it follows from the Slepian-Wolf coding theorem that the minimum rate required for lossless recovery of message X at the decoder in FIG. 2B is given by the conditional entropy H(X|Y) of X given Y. Since H(X|Y)≤H(X) for any (X, Y), by making use of side information Y, it is possible to use a lower message rate to communicate the same message X in FIG. 2B than in FIG. 2A. The stronger the correlation between X and Y, the lower the message rate can be achieved.

Improved Robustness

In a first implementation, the system may leverage side information Y at the decoder to improve robustness. In some such implementations, the encoder in FIG. 2B embeds a watermarking message into an image as follows:
1. Convert the watermarking message X to a K-bit binary string, where K is determined by H(X|Y).
2. Convert the K-bit binary string into a QR codeword.
3. Generate a watermarking image containing at least one copy of the QR codeword.
4. Blend the watermarking image and the original image by overlaying the former on top of the latter.

Correspondingly, the decoder of FIG. 2B decodes the watermarking message X from a screenshot of the watermarked image as follows:
5. Detect and extract a QR codeword from the screenshot.
6. Decode a K-bit binary string from the extracted QR codeword.
7. Decode the watermarking message X from the k-bit binary string and the side information Y.

Note that in many implementations, one or more of the steps above (e.g. steps 6-7) may be combined into a single step for better performance.

Note that a QR codeword includes patterns for detection and an error correction code in a 2D layout. In some embodiments, a 1D error correction codeword along with 1D patterns for detection may be used in place of a QR codeword for better performance/flexibility in generating a watermarking image. Examples of 1D error correction codes include Reed-Solomon codes, Turbo codes, LDPC (low-density parity-check) codes, and other general linear block codes.

In view of step 1 in the encoding process above, in order to determine K, one needs to know a priori H(X|Y), though knowledge of the realization of Y (i.e. the actual side information sequence) is not required. Examples of side information Y for which a priori knowledge of H(X|Y) is available include screenshot timestamps, decoding time, and any extraneous information about the screenshot (e.g. information about the site including its IP address and geographical location, publisher information, and platform information).

The following description uses screenshot timestamps as an example, but other similar implementations may utilize IP address information and/or platform information, or combinations of these.

Recall that the query ID discussed in FIG. 1B above is a 128-bit binary string consisting of a timestamp (64 bit), an IP address (32 bit), and a process id (32 bit) (not including any additional error coding bits). In typical applications, the screenshot timestamp $T_s$ is strongly correlated with the timestamp $T_q$ in the query ID such that $T_q \leq T_s$; and there exists a non-negative integer $\Delta$ such that $T_s - T_q \leq \Delta$ with high probability.

In view of these, instead of using 64 bits in such implementations for the timestamp, the encoder in FIG. 2B can use K=(ceil(64−log 2($\Delta$))+64) bits as an estimate of H(X|Y), where Y is $T_s$, and where "ceil" is a ceiling function that rounds up its argument to the nearest integer. Consequently, in one embodiment, a binning scheme is used to code $T_q$ where each bin contains candidate timestamps that are at least 4 microseconds apart, and the index of the bin is the suffix of $T_q$ of length ceil(64−log 2($\Delta$)).

The proposed binning scheme is based on the fact that the most significant bits are the same for two timestamps that are close to each other. For example, the timestamp for 2019 Jan. 1 in epoch time is: 1546300800, and its binary is:
0b0101 0111 1110 0101 1010 0011 0101 1110 0110 0110 0000 0000 0000

The timestamp for 2018 Jan. 1 is 1514764800, and its binary version is:
0b0101 0110 0001 1010 1011 1010 1001 1101 0010 1000 0000 0000 0000

The top 18 bits in their 64-bit representations are the same. The closer the two timestamps are, the more of the top significant bits are the same. In typical implementations, the image timestamp and screenshot timestamp may typically be significantly closer, such as within a day, a week, or a month, and thus have a greater number of bits the same.

Figure 1C:
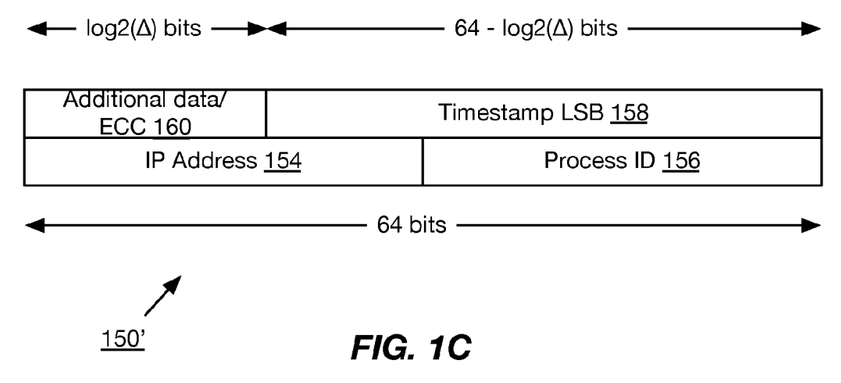
FIG. 1C is an illustration of a data format for image watermarking, according to another implementation.

By using the binning scheme described above, in some implementations, the system can use K=(ceil(64−log 2($\Delta$))+64) bits to code the query ID by removing about log 2($\Delta$) of the most significant bits in $T_q$. FIG. 1C is an illustration of a data format 150' for image watermarking, according to one such implementation. As shown, while the IP address 154 and process ID 156 are the same as in the implementation of FIG. 1B, the timestamp is reduced to a portion of the least significant bits 158, and additional data 160 may be added, without reducing the size of the data.

On the decoder side, after obtaining the K-bit binary string from extracting and decoding the QR code from a received screenshot, the timestamp LSB 158 may identify the index of the bin containing the correct timestamp $T_q$. To recover $T_q$, the decoder may combine the first log 2($\Delta$) bits of $T_s$ and the (64−log 2($\Delta$))-bit bin index to obtain $T'_q$. In instances where log 2($\Delta$) is not an integer, the smallest integer that is larger than log 2($\Delta$) is used here instead, i.e. ceil(log 2($\Delta$))). Since $T_s - T_q \leq \Delta$ with high probability in many implementations, it follows that $T'_q = T_q$ with high probability at the decoder. In the unlikely case where $T_s - T_q > \Delta$, as long as $T_s - T_q \leq m\Delta$ where m is a positive integer, $T_q$ must be among the following list of size m:

$$\{T'_q, T'_q - \Delta, T'_q - 2\Delta, \ldots, T'_q - (m-1)\Delta\}.$$

Since (ceil(64−log 2($\Delta$))+64)<128, these implementations effectively reduce the message rate required to recover the query ID at the decoder. Such reduction may in turn be leveraged in two ways to improve decoding success rate:
1. increasing the correction level in the selected QR code, e.g. by including additional parity or error correction bits; or
2. using a smaller macro QR code (e.g. Macro 17).

Note that a 21×21 QR code can store up to 152 bits of information as listed in the following table:

| ECC Level | Low | Medium | Quartile | High |
|---|---|---|---|---|
| Bits 21 × 21 | 152 | 128 | 104 | 72 |
| Numeric 21 × 21 | 41 | 34 | 27 | 17 |
| Numeric Macro17 | 35 | 30 | 21 | — |

By reducing the number of bits from 128 to K=(ceil(64−log 2(Δ))+64), the system can utilize a higher Error Correction Code (ECC) level or a smaller QR code to improve decoding success rate (e.g. changing from medium to quartile).

Improved Message Rate

The implementations discussed above make use of the side information available at the decoder to improve robustness of watermarking. From a different perspective, the system may also utilize the side information to improve message rate.

In such implementations, the encoder of FIG. 2B may embed a watermarking message into an image as follows:
1. Convert the 128-bit query ID along with K-bit additional information into a 128-bit binary string, where K is determined by H(X)−H(X|Y).
2. Convert the 128-bit binary string into a QR codeword.
3. Generate a watermarking image containing at least one copy of the QR codeword.
4. Blend the watermarking image and the source image by overlaying the former on top of the latter.

Correspondingly, the decoder of FIG. 2B may decode the watermarking message X from a screenshot of the image as follows:
4. Detect and extract a QR codeword from the screenshot.
5. Decode a 128-bit binary string from the extracted QR codeword.
6. Decode the 128-bit query ID along with the K-bit additional information from the 128-bit binary string and the side information Y.

In comparison to systems not implementing these methods, these implementations essentially provide additional K-bit messaging capability for free, i.e., with the same decoding success rate and the same distortion level. These additional K bits may be used to provide better tracking capability and/or user experience in terms of ease of use.

As noted above, although discussed primarily in terms of reducing the data size for a timestamp within the watermark data, a similar implementation may be used with binning applied to IP addresses and/or process identifiers. For example, if typical process identifiers are all less than 20 bits in length, 12 bits may be removed from the process ID 156 MSB. Similarly, part of the IP address (e.g. the leftmost 8 bits) within the watermark data may be derived from the side information available at the decoder (e.g. IP address used to submit the screenshot, IP address of the decoder, etc.). To further reduce data size, combinations of these fields may be processed in this way.

Figure 3:
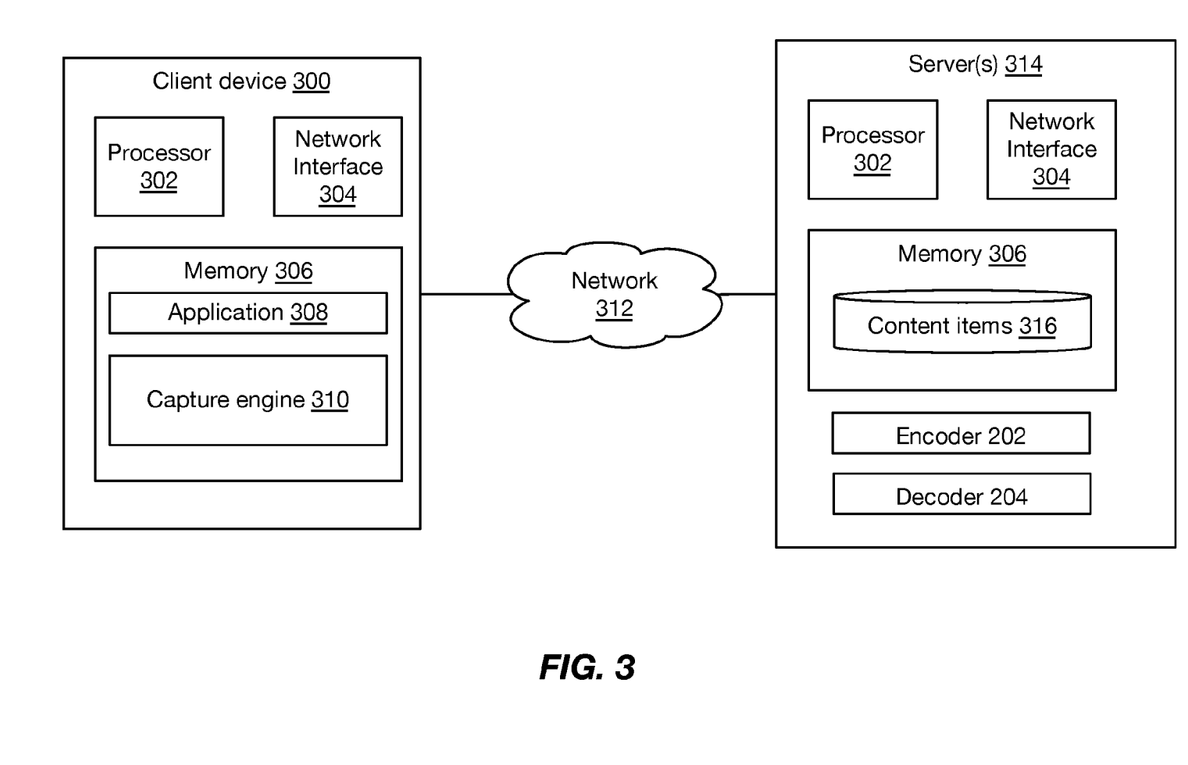
FIG. 3 is a block diagram of a system for image watermarking, according to some implementations.

FIG. 3 is a block diagram of a system for image watermarking, according to some implementations. A client device 300, which may comprise a desktop computer, laptop computer, tablet computer, wearable computer, smartphone, embedded computer, smart car, or any other type and form of computing device, may communicate via a network 312 with one or more servers 314.

In many implementations, a client device 300 may include a processor 302 and a memory device 306. The memory device 306 may store machine instructions that, when executed by the processor cause the processor to perform one or more of the operations described herein. The processor 302 may include a microprocessor, ASIC, FPGA, etc., or combinations thereof. In many implementations, a processor may be a multi-core processor or an array of processors. A memory device 306 may include, but is not limited to, electronic, optical, magnetic, or any other storage devices capable of providing a processor with program instructions. A memory device may include a floppy disk, CD-ROM, DVD, magnetic disk, memory chip, ROM, RAM, EEPROM, EPROM, flash memory, optical media, or any other suitable memory from which a processor can read instructions. The instructions may include code from any suitable computer programming language such as, but not limited to, C, C++, C#, Java, JavaScript, Perl, HTML, XML, Python and Visual Basic.

A client device 300 may include one or more network interfaces 304. A network interface 304 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network. In many implementations, a client device 300 may include a plurality of network interfaces 304 of different types, allowing for connections to a variety of networks 312. Correspondingly, network 312 may comprise a local area network (LAN), wide area network (WAN) such as the Internet, cellular network, broadband network, Bluetooth network, 802.11 (WiFi) network, satellite network, or any combination of these or other networks, and may include one or more additional devices (e.g. routers, switches, firewalls, hubs, network accelerators, caches, etc.).

A client device may include one or more user interface devices. A user interface device may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of a client device, such as a built-in display, touch screen, microphone, etc., or external to the housing of a client device, such as a monitor connected to a client device, a speaker connected to a client device, etc., according to various implementations.

Memory 306 may comprise an application 308 for execution by process 302. Application 308 may comprise any type and form of application, such as a media application, web browser, productivity application, or any other such application. Application 308 may receive images from a content server, including watermarks embedded within the images, and may display them via a user interface for a user of the client device.

Memory 306 may also comprise a capture engine 310, which may be part of application 308 (e.g. a plug-in or extension of a browser) and/or part of an operating system of the device. Capture engine 310 may comprise an application, server, service, daemon, routine, or other executable logic for capturing screenshots of rendered images including watermarks. Capture engine 310 may be configured to capture a screenshot of every image or some images. For example, in some implementations, capture engine 310 may be triggered to take a screenshot of an image responsive to metadata of the image, or responsive to a script executed by application 308 (e.g. responsive to a script embedded in a web page displayed by a browser for example). Capture engine 310 may, in some implementations, take a screenshot of just an image, or may take a screenshot of an entire display or screen. In a further implementation, capture engine may crop a captured image to just the desired image. This may be done for example based on coordinates of display of the image within the display. Capture engine 310 may add metadata to the screenshot, such as a capture time (e.g. in epoch time) as discussed above. Capture engine 310 may also transmit the screenshot to a monitoring server via network interface 304. In some implementations, capture engine 310 may comprise a script embedded in a web page and executed by an application 308 while rendering the web page; such web pages may also include an embedded image or a link to an image for the capture engine to capture a screenshot of.

Server 314 may include a content server and/or monitoring server, which may be the same or different devices. Server(s) 314 may include one or more processors 302, network interfaces 304, and memory devices 306. A content server 314 may comprise one or more content items 316 in storage, such as images to be watermarked, as well as other content (e.g. web pages, other media, etc.). Content server 314 may also comprise an encoder 202 as discussed above in connection with FIGS. 2A and 2B. Encoder 202 may comprise software, hardware, or a combination of hardware and software. For example, encoder 202 may comprise an ASIC, FPGA, or other dedicated hardware for embedding watermarks into images.

A monitoring server may comprise a decoder 204, as discussed above in connection with FIG. 2B. Decoder 204 may comprise software, hardware, or a combination of hardware and software. For example, decoder 204 may comprise an ASIC, FPGA, or other dedicated hardware for identifying and decoding watermarks from images. As discussed above, decoder 204 may receive side information to aid in decoding the watermark, such as a screenshot time from metadata of a screenshot received from a capture engine 310.

Figure 4:
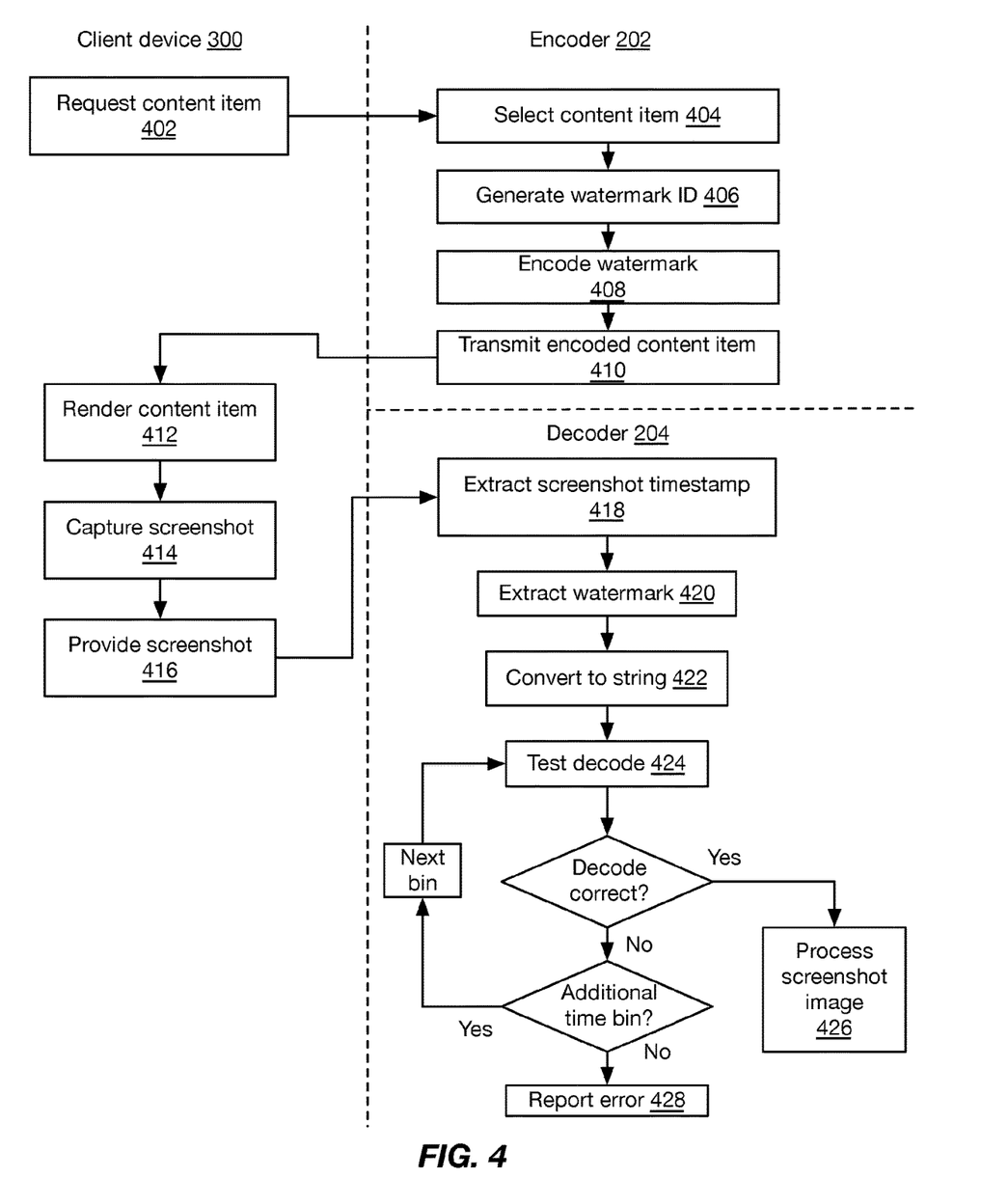
FIG. 4 is a flow chart of a method for image watermarking, according to some implementations.

FIG. 4 is a flow chart of a method for image watermarking, according to some implementations. At step 402, a client device may request a content item. The request may be triggered during rendering of a web page by a browser or other application (e.g. an interstitial content item during a break in a mobile game, or any other type and form of content). At step 404, a content server 314 may select a content item. The content item may be selected via any means, and may be based on the client device type, a user account or device identifier, contextual items within a web page or other application, or any other such information.

At step 406, the content server 314 may generate a watermark identifier, which may comprise one or more identifiers, including a timestamp, an identifier of the server or an IP address of the server, and/or a process identifier of the process used to select the content item. In some implementations, the watermark identifier may include additional information, such as an identifier of the content item. At step 408, the content item may be encoded with the watermark. As discussed above, encoding the content item may comprise generating an overlay with an alpha channel having pixels modified from a default value or pattern representing altered bits of the encoded watermark (e.g. a QR code or similar code). The watermarks may be repeated at predetermined intervals or spacing across the image. The overlay may then be blended or combined with the image to generate the encoded content item. At step 410, the encoded content item may be transmitted by the content server to the client device.

Although shown with the content server generating the watermark identifier and encoding the watermark after receiving the request for the content item, in some implementations, content items may be pre-encoded (e.g. before step 402), and the content server may select a pre-encoded content item for delivery. In many implementations, such pre-encoding may be performed within a predetermined time frame prior to the request. For example, content items may be encoded with a given timestamp and utilized for a predetermined time period (e.g. two weeks), and then replaced or re-encoded with a new timestamp. This may allow the content server to perform encoding processing during less busy times, while still ensuring that the content and timestamp are relatively fresh. As discussed above, the shorter the window during which pre-encoded content items may be used, the more data may be encoded in the watermark and/or the watermark made more robust; however, even in the example described above, windows of a year or more may be used while still significantly reducing the data required.

At step 412, the client device may render the content item, e.g. within an application such as a web browser, media player, game, or other application. At step 414, a capture engine of the client device (either executing as a separate service or as a plug-in or script of the application) may capture a screenshot of the content item. The screenshot may be cropped or limited to the content item, or may be of the full screen or a portion of the screen. The screenshot may be identified via metadata with a capture timestamp, and may include other identifiers (e.g. device identifiers, context identifiers of the application and/or web page, etc.). In other implementations, the capture timestamp may be provided via other means. For example, in some implementations, given that the capture time and time of transmission of the screenshot to a server are likely very close (e.g. within a few seconds), a packet transmission time (e.g. identified or extracted from a header of the packet, such as a timestamp option field of a transport layer header) or receipt time may be utilized as the capture timestamp. At step 416, the client device may transmit the screenshot to a monitoring server.

At step 418, a monitoring server, which may be a content server or a different device, may receive the screenshot and, in some implementations, may extract the timestamp from metadata of the screenshot or may identify a transmission or receipt time of the screenshot. The timestamp may be provided to a decoder of the monitoring server as side information.

At step 420, the decoder may scan the screenshot and extract any identified watermarks. In some implementations in which the watermark appears multiple times in the screenshot, the decoder may compare the identified watermarks and select or generate a watermark with the least distortion (e.g. a watermark that matches the highest number of other watermarks in the image, a watermark that is an average of the other identified watermarks, etc.). At step 422, the decoder may convert the watermark to a string.

At step 424, the decoder may generate a timestamp from a portion of the extracted timestamp from step 418 (e.g. a predetermined number of the least significant bits) and may test decoding of the string using the generated timestamp (e.g. applying error correction algorithms to the decoded string with the generated timestamp). If the string decodes correctly according to the error correction bits, then at step 426, the monitoring server may process the screenshot image or data related to the content item (e.g. identifying the content server via the IP address and process identifier, comparing the screenshot to the original content item to detect rendering distortion or corruption, tracking delivery of the content item, etc.).

If the string does not decode correctly, then the decoder may advance the generated timestamp according to the value A from the binning scheme, and may retest the decode at step 424. This may be repeated iteratively until either decoding is successful, or all of the bin index values have been tested (suggesting that the watermark was corrupted or improperly extracted, or that a content item from prior to usage time window discussed above was utilized). If all bin index values have been tested and decoding is unsuccessful, then at step 428, the decoder may report an error to an administrator or user of the system.

Accordingly, the systems and methods discussed herein provide for improved image watermarking to improve robustness and capacity, without degrading perceptibility. Specifically, the systems and methods discussed herein allow for a higher decoding success rate, at the same distortion level and message rate; or a higher message rate, at the same distortion level and decoding success rate. Implementations of these systems utilize a side chain of additional information, available only to the decoder and not the encoder, to achieve asymptotically lossless data compression, allowing the same message to be transmitted in fewer bits.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A decoder for a watermarking system, the decoder configured to:
    receive, from a client device, a packet comprising (i) a screenshot of an image displayed by the client device, the image watermarked with a string associated with image metadata associated with the image and (ii) screenshot metadata associated with the screenshot of the image, wherein the screenshot metadata comprises a timestamp of the screenshot of the image, and wherein the image metadata comprises a timestamp of the image, and wherein the string comprises a subset of the timestamp of the image,
    extract, from the packet, the screenshot metadata associated with the screenshot of the image and the string,
    using a portion of the screenshot metadata associated with the screenshot of the image, decode an identifier from the string, the identifier comprising the image metadata associated with the image, and
    track delivery of a content item associated with the image responsive to the decoded identifier, wherein the decoder is configured to decode the identifier from the string by concatenating a portion of the timestamp of the screenshot of the image with the subset of the timestamp of the image.

2. The system of claim 1, wherein the decoder is configured to extract the timestamp of the screenshot of the image from a header of the packet comprising the screenshot of the image and the metadata associated with the screenshot of the image.

3. The system of claim 1, wherein the decoder is configured to decode the identifier from the string by combining the portion of the metadata associated with the screenshot of the image with a predetermined offset.

4. The system of claim 3, wherein the decoder is configured to decode the identifier from the string by iteratively combining the portion of the metadata associated with the screenshot of the image with a multiple of the predetermined offset until successfully decoding the identifier.

5. The system of claim 1, wherein the string comprises an address of a content server that generated the image watermarked with the string.

6. The system of claim 5, wherein the string comprises an identifier of a process of the content server that generated the image watermarked with the string.

7. A method for watermarking, comprising:
receiving, by a decoder of a device from a client device, a packet comprising (i) a screenshot of an image displayed by the client device, the image watermarked with a string associated with image metadata associated with the image and (ii) screenshot metadata associated with the screenshot of the image, wherein the screenshot metadata comprises a timestamp of the screenshot of the image, and wherein the image metadata comprises a timestamp of the image, and wherein the string comprises a subset of the timestamp of the image;
extracting, by the decoder from the packet, the screenshot metadata associated with the screenshot of the image and the string;
using a portion of the screenshot metadata associated with the screenshot of the image, decoding, by the decoder, an identifier from the string, the identifier comprising the image metadata associated with the image; and
tracking, by the decoder, delivery of a content item associated with the image responsive to the decoded identifier, wherein the decoder is configured to decode the identifier from the string by concatenating a portion of the timestamp of the screenshot of the image with the subset of the timestamp of the image.

8. The method of claim 7, further comprising extracting, by the decoder, the timestamp of the screenshot of the image from a header of the packet comprising the screenshot of the image.

9. The method of claim 7, wherein decoding the identifier from the string further comprises combining the portion of the metadata associated with the screenshot of the image with a predetermined offset.

10. The method of claim 9, wherein decoding the identifier from the string further comprises iteratively combining the portion of the metadata associated with the screenshot of the image with a multiple of the predetermined offset until successfully decoding the identifier.

11. The method of claim 7, wherein the string comprises an address of a content server that generated the image watermarked with the string.

12. A watermarking system, comprising:
an encoder of a device configured to:
receive an image and image metadata associated with the image,
generate a string from a subset of the image metadata associated with the image,
encode a watermark from the string, and
embed the watermark in the image;
wherein a decoder of the device or a second device
receives, from a client device, a packet comprising (i) a screenshot of the image displayed by the client device, the image watermarked with the string generated from the subset of the image metadata associated with the image and (ii) screenshot metadata associated with the screenshot of the image, wherein the screenshot metadata comprises a timestamp of the screenshot of the image, and wherein the image metadata comprises a timestamp of the image, and wherein the string comprises a subset of the timestamp of the image;
extracts, from the packet comprising the screenshot of the image displayed by the client device and the screenshot metadata associated with the screenshot of the image, the string and the screenshot metadata associated with the screenshot of the image;
using a portion of the screenshot metadata associated with the screenshot of the image, decodes an identifier from the string, the identifier comprising a portion of the image metadata associated with the image; and
tracks delivery of a content item associated with the image responsive to the decoded identifier, wherein the decoder is configured to decode the identifier from the string by concatenating a portion of the timestamp of the screenshot of the image with the subset of the timestamp of the image.

13. A decoder for a watermarking system, the decoder configured to:
receive, from a client device, a packet comprising (i) a screenshot of an image displayed by the client device, the image watermarked with a string associated with image metadata associated with the image and (ii) screenshot metadata associated with the screenshot of the image, wherein the screenshot metadata comprises a timestamp of the screenshot of the image, and wherein the image metadata comprises a timestamp of the image, and wherein the string comprises a subset of the timestamp of the image, and wherein the string comprises a number of error correction bits greater than a difference between a length of the timestamp of the image and a length of the subset of the timestamp of the image;
extract, from the packet, the screenshot metadata associated with the screenshot of the image and the string;
using a portion of the screenshot metadata associated with the screenshot of the image, decode an identifier from the string, the identifier comprising the image metadata associated with the image; and
track delivery of a content item associated with the image responsive to the decoded identifier.

14. A method for watermarking, comprising:
receiving, by a decoder of a device from a client device, a packet comprising (i) a screenshot of an image displayed by the client device, the image watermarked with a string associated with image metadata associated with the image and (ii) screenshot metadata associated with the screenshot of the image, wherein the screenshot metadata comprises a timestamp of the screenshot of the image, and wherein the image metadata comprises a timestamp of the image, and wherein the string comprises a subset of the timestamp of the image, and wherein the string comprises a number of error correction bits greater than a difference between a length of the timestamp of the image and a length of the subset of the timestamp of the image;
extracting, by the decoder from the packet, the screenshot metadata associated with the screenshot of the image and the string;
using a portion of the screenshot metadata associated with the screenshot of the image, decoding, by the decoder, an identifier from the string, the identifier comprising the image metadata associated with the image; and
tracking, by the decoder, delivery of a content item associated with the image responsive to the decoded identifier.

15. A watermarking system, comprising:
an encoder of a device configured to:
receive an image and image metadata associated with the image, generate a string from a subset of the image metadata associated with the image,
encode a watermark from the string, and
embed the watermark in the image;
wherein a decoder of the device or a second device
receives, from a client device, a packet comprising (i) a screenshot of the image displayed by the client device, the image watermarked with the string generated from the subset of the image metadata associated with the image and (ii) screenshot metadata associated with the screenshot of the image, wherein the screenshot metadata comprises a timestamp of the screenshot of the image, and wherein the image metadata comprises a timestamp of the image, and wherein the string comprises a subset of the timestamp of the image, and wherein the string comprises a subset of the timestamp of the image, and wherein the string comprises a number of error correction bits greater than a difference between a length of the timestamp of the image and a length of the subset of the timestamp of the image;
extracts, from the packet comprising the screenshot of the image displayed by the client device and the screenshot metadata associated with the screenshot of the image, the string and the screenshot metadata associated with the screenshot of the image;
using a portion of the screenshot metadata associated with the screenshot of the image, decodes an identifier from the string, the identifier comprising a portion of the image metadata associated with the image; and
tracks delivery of a content item associated with the image responsive to the decoded identifier.

* * * * *

UNITED STATES PATENT AND TRADEMARK OFFICE
CERTIFICATE OF CORRECTION

PATENT NO. : 12,033,232 B2
APPLICATION NO. : 17/298012
DATED : July 9, 2024
INVENTOR(S) : Daan He et al.

Page 1 of 1

It is certified that error appears in the above-identified patent and that said Letters Patent is hereby corrected as shown below:

On the Title Page

At item (30), Line 1, "PCT/US2019/037995" should be -- PCT/US2019/037959 --.

Signed and Sealed this
Twenty-first Day of January, 2025

Coke Morgan Stewart
*Acting Director of the United States Patent and Trademark Office*